UNITED STATES PATENT OFFICE.

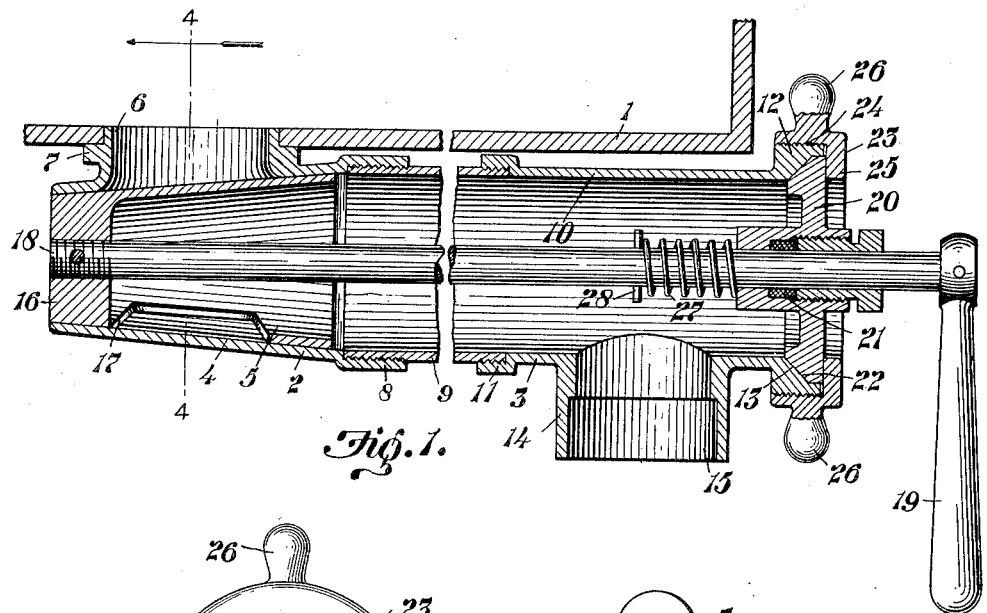
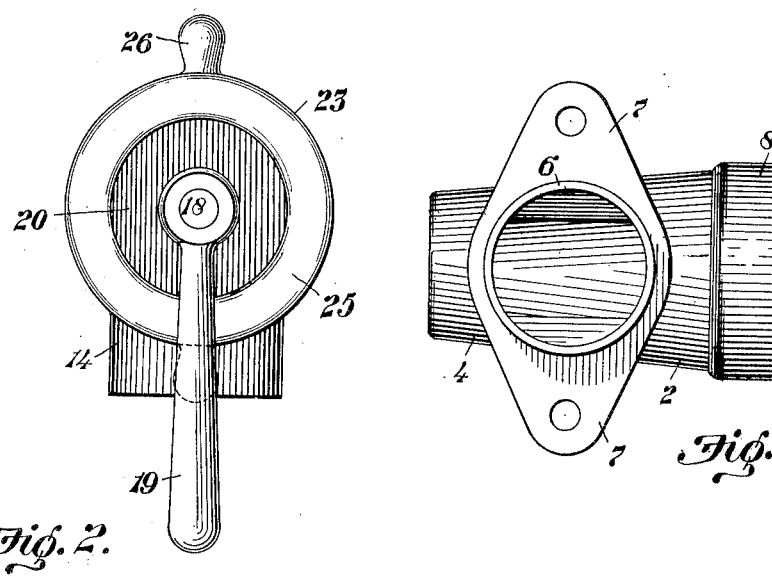

LEROY S. PFOUTS, OF CANTON, OHIO, ASSIGNOR TO THE MILLER PASTEURIZING MACHINE COMPANY, OF CANTON, OHIO, A CORPORATION OF NEW JERSEY.

VALVE.

1,097,668.      Specification of Letters Patent.      Patented May 26, 1914.

Application filed September 25, 1912. Serial No. 722,192.

*To all whom it may concern:*

Be it known that I, LEROY S. PFOUTS, a citizen of the United States, residing at Canton, in the county of Stark and State of Ohio, have invented a new and useful Valve, of which the following is a specification.

My invention relates to improvements in valves and especially to valves used in the handling of milk and cream in creameries, milk depots, ice cream making establishments and the like, the various parts of the valve being so made as to be readily separated from each other for thorough cleaning. Such valves are also frequently used in chemical establishments, and in fact in many different industries where it is desirable to clean containing vessels and valve or pipe connections at frequent intervals and in a thorough manner.

The objects of the invention are to generally improve devices of the character described, to provide a valve of simple, strong and durable construction, to so construct the valve that the cut-off member is located closely adjacent the entrant end of the valve, to provide for the ready disconnection of the various parts for the purpose of cleaning and to so construct the valve that in its practical application it may readily be made of any desired length as circumstances may require or convenience suggest. These objects, together with other objects readily apparent to those skilled in the art, may be attained by the construction illustrated in the accompanying drawings, although the invention may be embodied in other forms, the construction illustrated being chosen by way of example.

In the drawings Figure 1 is a longitudinal, vertical sectional view through a valve embodying my invention showing same connected to the bottom of a vat or tank, and parts being broken away to reduce the size of the figure. Fig. 2 is a front end elevation of the valve. Fig. 3 is a top view of the entrant end of the valve. Fig. 4 is a transverse sectional view on the line 4—4 of Fig. 1.

Throughout the several views similar reference numerals indicate similar parts.

More specifically describing the construction disclosed in said drawings, the numeral 1 indicates the bottom of a vat or tank adapted to contain liquid to be drawn off through the valve.

The numeral 2 indicates generally the entrant member and the numeral 3 the discharge or spout member. The entrant member comprises the internally frusto-conical casing 4 internally ground to receive the correspondingly shaped, externally ground cut-off member 5. Connected to the casing 4 is the entrant collar 6 which extends laterally from said casing and is provided with the integral flange and ears 7 for attachment to the bottom 1. Both ends of the casing 4 are open and at the larger end the integral, enlarged internally screw threaded flange 8 is provided to receive the connecting member 9 which member consists of a piece of tubing with external screw threads at its two ends, said tubing being of any desired length in accordance with the requirements.

The discharge member 3 comprises a cylindrical body portion 10 provided at its rear end with the integral, enlarged internally screw threaded flange 11 adapted to receive the front end of the member 9 and at its forward end with the outwardly extending externally screw threaded, annular flange 12 provided internally with the beveled, ground head-seat 13. The portion 10 is also provided with the integral discharge collar or spout 14 which may be provided with means for the attachment of sanitary pipe or the like, if desired, the valve in the drawings being provided with the inner annular recess 15 adapted to receive an end of such pipe.

The cut-off member 5 is provided with frusto-conical side walls and a head 16 at the smaller end closes the same, while at the larger end said cut-off member opens into the member 9. In the side walls of the member 5 is provided the valve opening 17 which, by rotation of the member 5 within the casing 4, may be brought to register with the collar 6, in which condition the valve is open, or may be turned away from said collar, as shown in Fig. 1, when the side walls of the member 5 will close the collar 6. Fixedly connected to the head 16 and extending forwardly through the member 5, member 9 and member 3 is the valve stem 18 preferably provided at its forward end with the fixedly connected valve lever 19 by which said stem may be manually rotated. Mounted upon the stem 18 is the circular head 20, preferably provided with packing 21 to produce liquid tight but rotatable connection between said head and the stem 18. The head 20 is also provided with the beveled, ground seating face 22 adapted for engagement with the seat 13, and a retaining ring 23 provided with screw threads 24 engaging the screw threads on the annular flange 12 and with an inwardly extending head retaining flange 25 is provided. Said ring may be provided with means such as the knobs 26 for conveniently turning said ring onto and off of the flange 12. Located upon the stem 18 within the member 3 is a coil spring 27 bearing against the head 20 and a pin 28 in the stem 18 to yieldingly hold the cut-off member 5 firmly seated within the casing 4.

Attention should be called to the fact that the internal diameter of the members 9 and 3 is slightly greater than the greatest external diameter of the member 5, and it will be readily apparent from an inspection of Fig. 1 that by unscrewing the retaining ring 23 from the flange 12 the head 20, with the stem 18 and member 5 may be removed, whereupon the members 3, 9 and 4 will be open for thorough cleaning, as by means of a swab or brush, the rear end of the member 4 being open so as to give free access either from the front or rear end of the valve. The collars 6 and 16 may of course be readily cleaned and the stem 18 and parts connected thereto may also be readily cleaned before replacing.

It should be noted that the valve described is particularly well adapted for use on mixing vats for ice cream making and the like. The batches of material mixed in such vats include sugar, flavors and the like, which have a tendency to settle to the bottom of the tank and in case a valve is used which has a large opening or space intermediate the entrant end and the valve or closing member, such sugar and the like will settle into such space, fail to be mixed with the batch, and will be drawn off in unmixed condition when the valve is first opened. In the construction herein described, however, the cut-off member is located at the entrant end of the valve and there is no recess of any appreciable extent into which such sugar or other heavy ingredients may enter and escape mixture with the batch.

I claim:—

1. A valve comprising a tubular body open at its front and rear ends, a hollow cut-off member provided with a lateral wall rotatably slidingly engaging the internal wall of said body at the rear end thereof and provided with a transverse head at its rear end adapted to close the rear end of said body, said body and the lateral wall of said cut-off member each provided with a lateral opening and the opening in said cut-off member adapted to be brought into and out of register with the opening in said body by rotation of said cut-off member, a valve stem connected to said transverse head and extending forwardly through said cut-off member and body, and disconnectible means connecting said stem and said body at the forward end thereof adapted to maintain said cut-off member in operative location within said body, said means, when disconnected, permitting the removal of said cut-off member and stem by forward movement thereof through said body.

2. A valve comprising, in combination with a tubular body open at the rear end thereof and provided adjacent said end with a lateral entrant opening, a cut-off member on the interior of said body at the entrant end, said cut-off member provided with a frusto-conical wall in rotating-sliding engagement with the inner surface of said body, said cylindric wall provided with a lateral opening adapted to be brought into and out of register with said entrant opening by rotation of said cut-off member, said cut-off member further provided with a rear end wall adapted to close the end of said body, a stem connected to said rear end wall and extending forwardly through said cut-off member and body and constituting means whereby to rotate said cut-off member, and means at the forward end of said body for closing the forward end thereof and connecting said body and stem and adapted, when so connected, to maintain said cut-off member in operative location within said body, said connecting means adapted to be disconnected and permit the removal of said closing member and stem by forward sliding movement through said body and said body provided adjacent its forward end with a lateral discharge opening.

3. A valve comprising a tubular body provided with a lateral entrant opening adjacent one end of said body and a lateral discharge opening adjacent the other end thereof, said body being internally frusto-conical at the entrant end and provided with a removable head at the discharge end, an externally frusto-conical cut-off member rotatably arranged in said body at the entrant end thereof and adapted, by rotation, to open and close said entrant opening, and a valve stem connected to said cut-off member, extending through said head and adapted to actuate said cut-off member, said head, when attached to said body, constituting the sole means for holding said cut-off member in place within said entrant end and said cut-off member being removable through said discharge end of said body when said head is disconnected.

4. A valve comprising, in combination with a tube, an entrant member and a spout member, each provided with means for connecting the same to said tube, said entrant member provided with a lateral entrant opening and said spout member provided with a lateral discharge opening, said entrant member being internally frusto-conical and having a rear opening at its smaller end opposite the end connected to said tube and the front end of said spout member, opposite the end connected to said tube provided with a removable closure, a hollow, frusto-conical cut-off member arranged in said entrant member and provided with a head at its smaller end adapted to close said rear opening in said entrant member, said cut-off member at its larger end opening into said tube and provided with a lateral valve opening, said cut-off member adapted for rotation in said entrant member to bring said valve opening into and out of register with said entrant opening, and a valve stem fixedly connected to said cut-off member and extending through and rotatably arranged in said closure, said closure, when attached to said discharge member, constituting sole means for holding said cut-off member in place within said entrant member, said stem adapted to actuate said cut-off member and said cut-off member and stem adapted to be slidably removed from said entrant member, tube and spout member when said closure is disconnected from said spout member.

5. A valve comprising a tubular body provided with an entrant member at one end and a spout member at the other, said entrant member provided with a lateral entrant opening and said spout member provided with a lateral discharge opening, said entrant member internally frusto-conical and having a rear opening at its smaller end, and the front end of said spout member provided with a removable closure, a hollow, frusto-conical cut-off member rotatably arranged in said entrant member and provided with a head at its smaller end adapted to close said rear opening in said entrant member, said cut-off member opening into said tubular body, and in its side wall, provided with a lateral valve opening, said valve opening being adapted to be brought into and out of register with said entrant opening by rotation of said cut-off member, a valve stem fixedly connected to said cut-off member and extending through and rotatably arranged in said closure, said cut-off member and stem adapted to be slidably removed from said tubular body by forward movement through and out of said spout member when said closure is removed from said spout member, and said stem adapted for holding said cut-off member in operative position in said entrant member when said closure is connected to said spout member.

6. A valve comprising a tubular body having front and rear open ends and provided adjacent the rear end with a lateral entrant opening and adjacent the front end with a lateral discharge opening, said body at the entrant end formed internally frusto-conical, with the smaller end of the frusto-conical portion rearwardly disposed, a hollow cut-off member provided with a frusto-conical side wall seating in said frusto-conical portion of the tubular body, having its forward end open and its rear end closed by a transverse wall, the side wall of said cut-off member provided with a valve opening adapted, by rotation of said cut-off member, to be brought into and out of register with said entrant opening, a valve stem fixedly connected to said cut-off member in the rear wall thereof, and extending axially forwardly through said cut-off member and body and provided forwardly beyond the forward end of said body with means for the rotation of said stem, a head adapted to be connected to said body, to close the forward end thereof, said stem extending through said head and rotatable therein, connecting means for connecting said head to said body, and spring means engaging said head and stem and adapted to urge said stem and cut-off member backwardly when said head is connected to said body, whereby to yieldingly maintain said cut-off member in seated position, and said head, stem and cut-off member adapted to be removed from said body when said connecting means is disconnected.

In testimony that I claim the above, I have hereunto subscribed my name in the presence of two witnesses.

LEROY S. PFOUTS.

Witnesses:
WILLIAM H. MILLER,
JOHN H. BISHOP.